Patented May 8, 1923.

1,454,204

UNITED STATES PATENT OFFICE.

ALOIS ZINKE, OF GRAZ, AUSTRIA, ASSIGNOR TO HANS PEREIRA, OF VIENNA, AUSTRIA.

PROCESS OF MANUFACTURING DIOXYPERYLENE AND PERYLENE.

No Drawing.   Application filed February 24, 1921.   Serial No. 447,561.

*To all whom it may concern:*

Be it known that I, ALOIS ZINKE, a citizen of and a resident of Graz, Austria, have invented certain new and useful Improvements in the Processes of Manufacturing Dioxyperylene and Perylene, of which the following is a specification.

The processes heretofore proposed for manufacturing perylene ($C_{20}H_{12}$) from naphthaline derivatives were not adapted to be carried into practice on a commercial scale owing to the difficulties met with in practically carrying them out.

According to my invention I overcome these difficulties by using as the prime material for manufacturing perylene, a new derivative thereof discovered by me which I call dioxyperylene and which has the formula $C_{20}H_{12}O_2$, and which I believe may be considered as the hydrocarbon perylene in which two H atoms are substituted by the OH group.

This new compound and the method of manufacturing the same do not form part of the present application; they are fully set forth in an application for patent filed June 14, 1922, and bearing Serial No. 568,289, series of 1915 and being a division of the present application.

In order to produce perylene from the new compound dioxyperylene I remove therefrom the oxygen by reducing agents and thus obtain the known hydrocarbon perylene.

I intimately mix 1 part by weight of dioxyperylene with for instance 4 parts by weight of zinc dust and heat the whole over zinc coated pumice in a current of hydrogen to a temperature slightly above the boiling temperature of perylene, that is to a temperature of from 480 to 500 degrees centigrade, whereby perylene is distilled off as a reddish-yellow oil readily solidifying which shows all the properties of the perylene known in literature. By recrystallization by means of known solvents such as benzole or glacial acetic acid it may be purified.

This reaction is almost quantitative.

As far as this invention is concerned it does not matter whether the removal of the oxygen from the dioxyperylene is due to a simple reduction by the zinc or by the hydrogen or by both or whether such removal is due to a sort of hydrogenation previously observed of oxygen containing substances, for instance borneol, in which, without the addition of hydrogen, oxygen is removed, but the metal only plays the part of a catalyzer and not that of a reducing agent. This question needs not be further discussed here, it being of no consequence for the essence of my invention.

I claim:

1. A process for manufacturing perylene consisting in reducing dioxyperylene by reducing agents.

2. A process for manufacturing perylene consisting in reducing dioxyperylene by a metal at a temperature above the distilling temperature of perylene.

3. A process for manufacturing perylene consisting in reducing dioxyperylene by zinc at a temperature above the distilling temperature of perylene.

4. A process for manufacturing perylene consisting in reducing dioxyperylene by a metal in a current of hydrogen at a temperature above the distilling temperature of perylene.

5. A process for manufacturing perylene consisting in reducing dioxyperylene by zinc in a current of hydrogen at a temperature above the distilling temperature of perylene whereby perylene is obtained.

In testimony whereof, I affix my signature, in presence of two witnesses.

DR. ALOIS ZINKE.

Witnesses:
 Dr. ALBERT KLINGER,
 Dr. ALEXANDER ROLLETT.